United States Patent Office 3,595,929
Patented July 27, 1971

3,595,929
PROCESS FOR PREPARING METHYL-
CYCLOHEXENES
André Lakodey and Francis Weiss, Pierre-Benite, France, assignors to Ugine Kuhlmann
No Drawing. Filed Dec. 9, 1969, Ser. No. 883,581
Claims priority, application France, Dec. 10, 1968, 177,358
Int. Cl. C07c 1/24
U.S. Cl. 260—666    3 Claims

ABSTRACT OF THE DISCLOSURE

Methylcyclohexenes of the following formula:

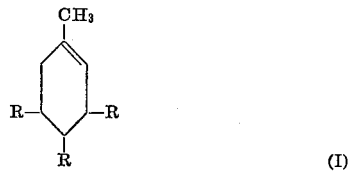

(I)

in which R represents a methyl radical or a hydrogen atom and in which at least one R substituent is a hydrogen atom and those two R representing methyl radical are adjacent, are prepared by dehydrating a hexahydrobenzylic alcohol having the following Formula II

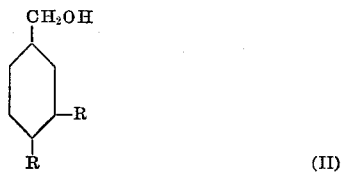

(II)

in which R has the meaning given above, in the vapor phase.

BACKGROUND OF THE INVENTION

The usual processes for preparing methylcyclohexenes consist in selectively reducing an aromatic hydrocarbon with an alkaline or an alkaline earth metal or in dehydrating methylcyclohexanols which are in turn obtained by hydrogenation of the corresponding methylphenols. The process of selectively reducing an aromatic hydrocarbon is difficult to perform and it is not very selective. The process of forming methylcyclohexenes by dehydrating methylcyclohexanols requires the use of relatively expensive raw materials.

A process has also been proposed for preparing methylcyclohexenes by dehydrating hexahydrobenzylic alcohol both in the liquid phase and acid medium. This process, however, is again difficult to perform, particularly in a continuous manner and also gives rise to corrosion problems.

SUMMARY OF THE INVENTION

This invention broadly involves the dehydration of a hexahydrobenzylic alcohol (II) in the vapor phase to selectively produce the methylcyclohexene. The dehydration reaction of the hexahydrobenzylic alcohol (II) when dehydrated according to this invention, produces the normal product of dehydration, namely methylenecyclohexane which in the vapor phase is immediately isomerized to selectively produce methylcyclohexene according to the following equation:

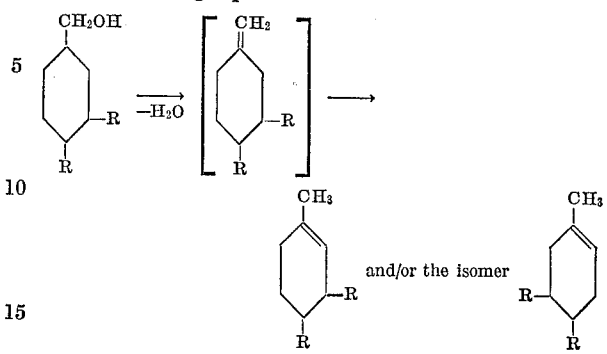

in which R has the above assigned designations.

According to this invention the dehydration of the hexahydroxybenzylic alcohol is carried out in the vapor phase by passing the vapors of hexahydroxybenzylic alcohol in contact with or on a solid dehydrating catalyst.

Various solid dehydrating catalysts can be used according to this invention, including the oxides of aluminum, thorium, titanium, tungsten, boron, silica, activated clay, kaolin, and so forth. Further examples of catalysts that can be used according to this invention to effect the dehydration of the hexahydrobenzylic alcohol include phosphoric anhydride and polyphosphoric acids deposited on metallic grains, such as aluminum grains. Various other catalysts could be used to effect the dehydration of the hexahydrobenzylic alcohol according to this invention as will be apparent to those skilled in the art.

The temperature and pressure that can be used to carry out the dehydration reaction of the hexahydrobenzylic alcohol according to this invention can be varied quite widely. The temperature that can be used, for example, can be between 180° to 450° C. and the pressure of the reaction can be varied from between about 0.1 and 2 bars.

The vapors of the hydrobenzylic alcohol can be contacted with the solid catalyst directly or, if desired, the vapors of the hexahydrobenzylic alcohol can be diluted with a stream of an inert gas, such as nitrogen.

The mixture resulting from the reaction that may contain, besides the 1-methylcyclohexenes, unreacted hexahydrobenzylic alcohol, methylenecyclohexane and isomeric methylcyclohexenes in which the double bond has migrated towards other positions inside the cycle. If desired, these various constituents contained in the reaction mixture can be recycled after having been separated from the main product by distillation.

One of the more important products produced according to this invention is 1-methylcyclohexene. The 1-methylcyclohexenes produced according to this invention are known products and have known uses such as for preparing the corresponding epoxides, 2-methylcyclohexanones and ε-methyl-ε-caprolactones.

The hexahydrobenzylic alcohols which are dehydrated according to this invention to form the hexahydrobenzylic alcohols can be readily obtained by known methods either by hydrogenation of the corresponding benzylic alcohols or preferably by the hydrogenation of the Δ-3-tetrahydrobenzaldehydes prepared according to the well known Diels Alder reaction from acrolein and a conjugated diolefin such as butadiene, the isoprene or the 2-3-dimethylbutadiene.

The following examples illustrate various specific manners of carrying out the invention:

EXAMPLE I

A suitable reaction vessel consisting of a stainless steel tube NSMC, having dimensions of 12 x 700 mm. was heated by means of an electric furnace. A catalyst consisting of aluminum balls of 1 to 2 mm. were placed in the stainless steel tube filling a volume of about 70 cm.³ therein. 57 grams per hour of the vapors of hexahydrobenzylic alcohol diluted in 5 liters per hour of nitrogen were then passed through the stainless steel tube over the catalyst at a temperature of 350° C. for three hours. At the outlet of the reaction vessel the vapor mixture was condensed and the organic layer composed of hydrocarbons and unreacted hexahydrobenzylic alcohol were decanted therefrom. The resulting product weighed 137 grams and was composed of, by weight, 90.8 percent of 1-methylcyclohexene, 2.9 percent of methylenecyclohexane, 4.6 percent of 3- (or 4-) methylcyclohexene and traces of unreacted hexahydrobenzylic alcohol. The hexahydrobenzylic alcohol was practically completely converted to the 1-methylcyclohexene and the yield thereof was 86 percent of the theoretical yield.

EXAMPLE II

The process of Example I was again carried out in the identical manner except that the temperature was maintained at 300° C. At this temperature 144 grams of reaction product was recovered comprising, by weight, 32.5 percent of 1-methylcyclohexene, 26.5 percent of methylenecyclohexane, 2.8 percent of 3- (or 4-) methylcyclohexene and 21 percent of unreacted hexahydrobenzylic alcohol.

The transformation rate of hexahydrobenzylic alcohol was 63 percent and the yield of 1-methylcyclohexene was 40 percent of the theoretical yield, based on the reacted hexahydrobenzylic alcohol.

EXAMPLE III

Example I was again repeated in the identical manner execept that the temperature was maintained at 400° C. At this temperature 139 grams of the reaction product was obtained comprising, by weight, 74 percent of 1-methylcyclohexene, 3.3 percent of methylenecyclohexane, 15 percent of 3- (or 4-)methylcyclohexenes and 0.4 percent of unreacted hexahydrobenzylic alcohol. In this example the hexahydrobenzylic alcohol was almost completely reacted or transformed and the yield of 1-methylcyclohexene was 72 percent.

The other products coming within the scope of the Formula I can be produced in the same manner by variation of the R substituents on the hexahydroxybenzylic alcohol as diclosed above in the generic Formula II.

We claim:
1. The process of preparing methylcyclohexenes having the Formula I

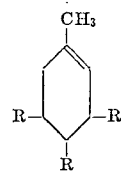

wherein R represents a methyl radical or a hydrogen group and in which at least one of the R substituents is a hydrogen atom, those two R representing methyl radicals being adjacent, which comprises dehydrating a hexahydrobenzylic alcohol having the Formula II

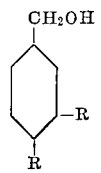

in which R has the same meaning as defined above, in the vapor phase and in contact with a dehydrating catalyst.

2. The process according to claim 1 wherein the reaction is carried out at a temperature between about 180 and 450° C.

3. The process according to claim 2 in which the dehydrating catalyst is at least one member of the group consisting of the oxides of aluminum, thorium, titanium, tungsten, boron, a silica, activated clay, kaolin clay, or phosphoric anhydride or phosphoric acid deposited on aluminum grains.

References Cited

UNITED STATES PATENTS

| | | | |
|---|---|---|---|
| 3,251,896 | 5/1966 | Navarre | 260—666 |
| 3,275,698 | 9/1966 | Parish | 260—666 |
| 3,299,154 | 1/1967 | Kidwell et al. | 260—666 |

DELBERT E. GANTZ, Primary Examiner

V. O'KEEFE, Assistant Examiner